US005907203A

United States Patent [19]
Chen et al.

[11] Patent Number: 5,907,203
[45] Date of Patent: May 25, 1999

[54] VOLTAGE REGULATOR SPACING MEMBER

[75] Inventors: Jianing Chen, Oklahoma City; Michael D. Ballard, Edmond, both of Okla.

[73] Assignee: Unit Parts Company, Oklahoma City, Okla.

[21] Appl. No.: 08/858,308

[22] Filed: May 19, 1997

[51] Int. Cl.$^6$ .................................................. H02K 11/00
[52] U.S. Cl. ........................ 310/65; 310/52; 310/91; 310/67 R; 310/64
[58] Field of Search .................... 310/65, 67 R, 310/52, 91, 168, 235, 239, 232, 233

[56] References Cited

U.S. PATENT DOCUMENTS

| | | | |
|---|---|---|---|
| 4,162,414 | 7/1979 | Takabatake | 310/68 R |
| 4,293,788 | 10/1981 | Binder | 310/68 D |
| 4,680,495 | 7/1987 | Chiampas et al. | 310/220 |

*Primary Examiner*—Nestor Ramirez
*Assistant Examiner*—Tran N. Nguyen

*Attorney, Agent, or Firm*—Dunlap, Codding & Rodgers, P.C.

[57] ABSTRACT

A spacing member for use with an alternator of the type having an electrical generating assembly housed in a frame with an external mounting surface to which a voltage regulator is adapted to be mounted. A brush assembly is connected to the voltage regulator and has a pair of brushes adapted to engage a pair of slip rings of the electric generating assembly when the brush assembly is positioned in a slip ring engaging position, the spacing member supports the voltage regulator in a spaced apart relationship relative to the mounting surface of the frame so as to provide an air flow passage between the voltage regulator and the mounting surface for enhancing heat transfer away from the voltage regulator and the spacing member supports the voltage regulator in a spaced apart relationship relative to the brush assembly so as to support the brush assembly in the slip ring engaging position.

10 Claims, 3 Drawing Sheets

VOLTAGE REGULATOR SPACING MEMBER

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE INVENTION

1. Field of the Invention

The present invention relates generally to spacing devices, and more particularly, but not by way of limitation, to a spacing member for connecting a voltage regulator in a spaced relationship to a housing of an alternator so as to enhance heat transfer away from the voltage regulator by creating an effective air flow path.

2. Brief Description of the Related Art

Alternators for automobiles are provided with a housing in which a rotor coil is supported. The engine of the automobile is utilized to rotate the rotor coil to generate a rotating magnetic field that induces a current in stator windings disposed near the rotor coil. The speed at which the rotor coil rotates and the intensity of the rotor coil's magnetic field determine the voltage and current of the electricity generated by the alternator. To control the intensity of the magnetic field generated by the rotor coil so that the output voltage of the alternator remains within predefined limits, a voltage regulator is generally employed with an alternator.

The positioning of voltage regulators relative to the alternator housing is varied with different makes and models of alternators. For example, with some alternators the voltage regulator is mounted a distance from the alternator. In other alternators the voltage regulator is mounted within the alternator housing. Finally, in some makes and models, in particular Ford IAR 3G alternators, the alternator housing is provided with an external mounting surface to which the voltage regulator is mounted.

Overheating of the voltage regulator is a primary cause of alternator failure. The voltage regulator is subjected to both external heat produced from the automobile engine and internal heat produced by the flow of electric current through the voltage regulator itself. And while many voltage regulators are provided with a heat sink to transfer the heat away from the voltage regulator, the manner in which the voltage regulators are designed to be mounted to the alternator housing does not permit adequate air circulation across the heat sink and thereby prevents heat from being effectively transferred away from the voltage regulator.

To this end, a need exists for a voltage regulator spacing member which permits the voltage regulator in certain models of alternators to be spaced from the alternator housing so as to increase air flow through the voltage regulator heat sink and thus increase heat transfer away from the voltage regulator. It is to such an apparatus that the present invention is directed.

BRIEF SUMMARY OF THE INVENTION

The present invention is directed to a spacing member for use with an alternator of the type having an electrical generating assembly housed in a frame with an external mounting surface to which a voltage regulator is adapted to be mounted. A brush assembly is connected to the voltage regulator and has a pair of brushes adapted to engage a pair of slip rings of the electric generating assembly when the brush assembly is positioned in a slip ring engaging position. The spacing member supports the voltage regulator in a spaced apart relationship relative to the mounting surface of the frame so as to provide an air flow passage between the voltage regulator and the mounting surface for enhancing heat transfer away from the voltage regulator and the spacing member supports the voltage regulator heat sink in a spaced apart relationship relative to the brush assembly so as to support the brush assembly in the slip ring engaging position.

The objects, features and advantages of the present invention will become apparent from the following detailed description when read in conjunction with the accompanying drawings and appended claims.

DETAILED DESCRIPTION OF THE INVENTION

Figure 1:
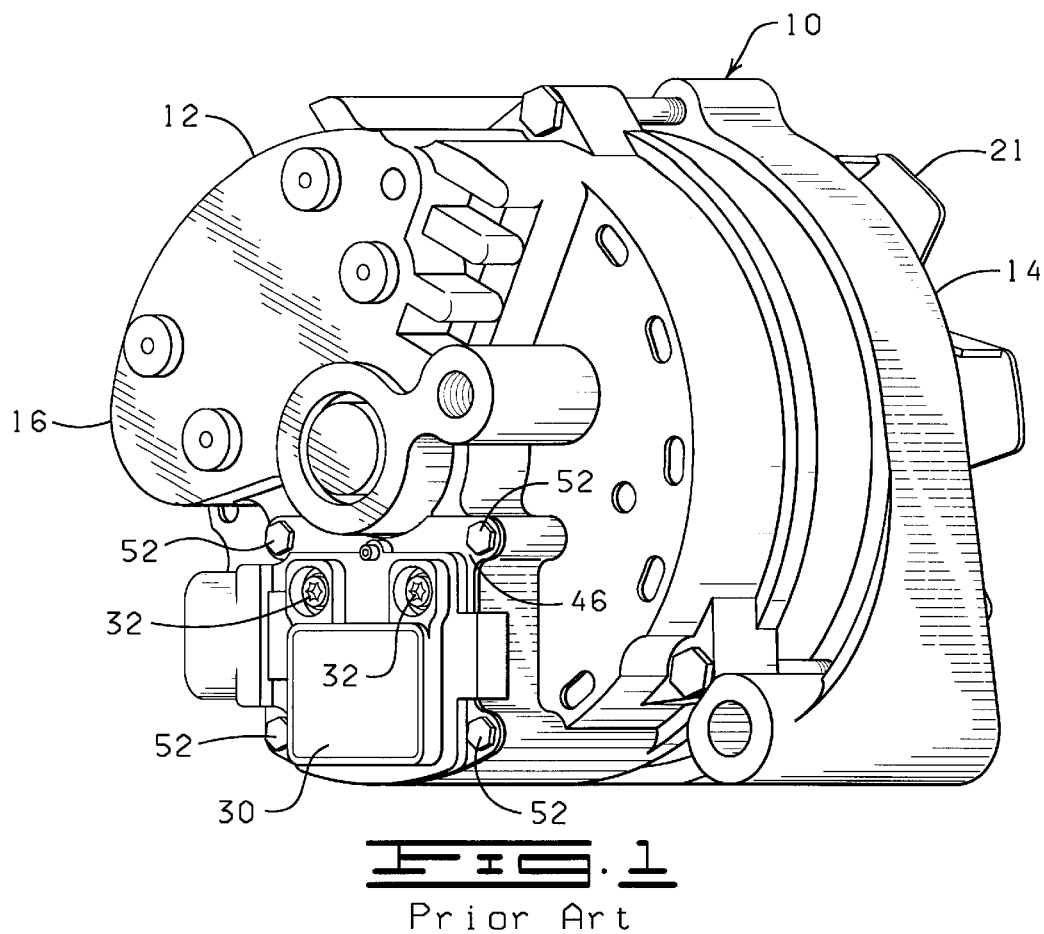
FIG. 1 is a perspective view of a prior art Ford IAR 3G alternator.
Figure 2:
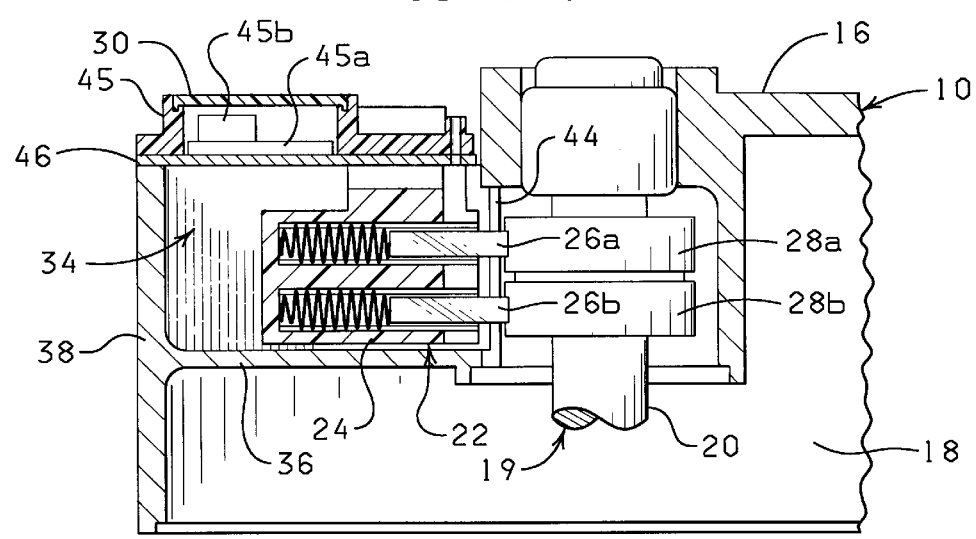
FIG. 2 is a partially cross sectional view of the alternator of FIG. 1.
Figure 3:
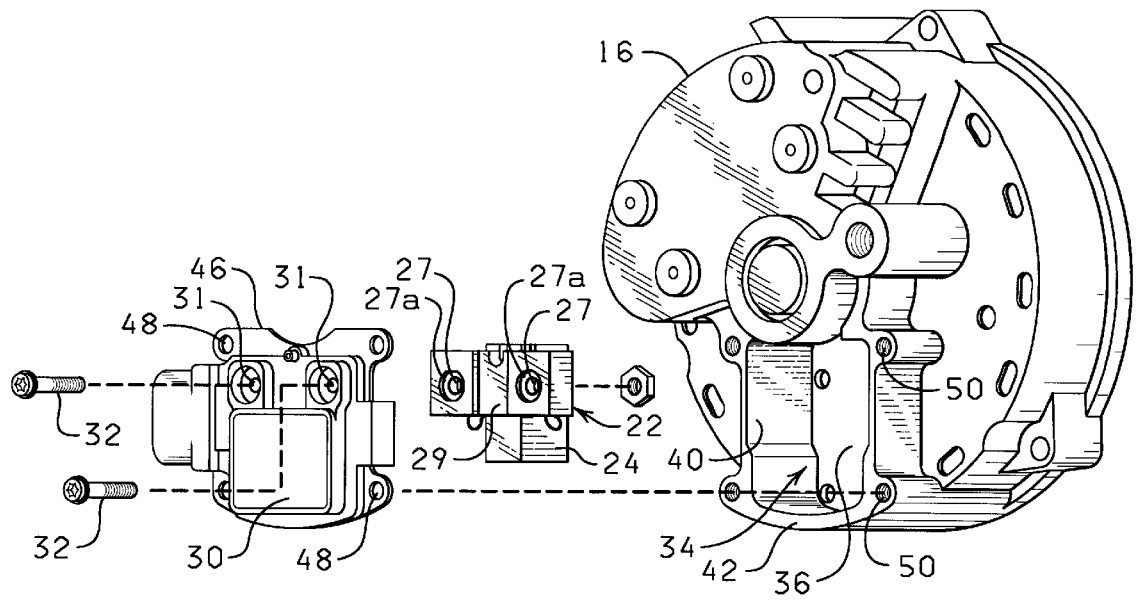
FIG. 3 is an exploded view of the voltage regulator and the slip ring end frame of the alternator of FIG. 1.

Referring now to the drawings, and in particular to FIGS. 1–3, an alternator 10 for use with an engine of an automobile is shown. The alternator 10 is provided with a housing 12 which includes a drive end frame 14 and a slip ring end frame 16. The housing 12 defines an alternator interior space 18 (FIG. 2) adapted to receive an electric generating assembly 19 (FIG. 2), which includes a rotor coil (not shown) in which a magnetic field is generated by rotating the rotor coil relative to a stator (also not shown). The rotor coil is mounted on a drive shaft 20 which is rotated by the automobile's engine so that a current is induced in the stator. The alternator 10 further includes a rotor fan 21 mounted on the drive shaft 20 and adapted to pull air through the alternator 10 from the slip ring end frame 16 to the drive end frame 14 when rotated by rotation of the drive shaft 20.

To supply electricity to the rotor coil to generate a rotating magnetic field, the alternator 10 is provided with a brush assembly 22 (FIGS. 2). The brush assembly 22 includes a brush housing 24 and a pair of brushes 26a and 26b. The brush housing 24 includes a pair of holes 27 provided with counterbores 27a and a central channel 29 (FIG. 3). In an assembled condition of the alternator 10, as best illustrated in FIG. 2, the brush 26a slidingly engages a slip ring 28a of the electric generating assembly 19 and the brush 26b slidingly engages a slip ring 28b of the electric generating assembly 19 when the brush assembly 22 is positioned in a slip ring engaging position. Each of the slip rings 28a and 28b are mounted on the drive shaft 20 and are electrically connected to the rotor coil in a conventional manner.

A voltage regulator 30 is electrically connected to the brush assembly 22 for controlling the intensity of the magnetic field generated by the rotor coil so that the voltage output of the alternator 10 is maintained within predefined limits. The brush assembly used with certain makes and models of alternators, in particular Ford IAR 3G alternators, is secured to the voltage regulator 30 by aligning a pair of holes 31 of the voltage regulator 30 with the holes 27 of the brush housing 24 and registering a pair of boss members (not shown) formed on the underside of the voltage regulator 30 with the counterbores 27a of the brush housing 24 and fastening the brush housing 24 to the underside of the voltage regulator 30 with a pair of fasteners 32.

To accommodate the brush assembly 22, the slip ring end frame 16 is provided with an opening or cavity 34 formed adjacent the slip rings 28a and 28b. In the Ford IAR model, the cavity 34 is defined by a bottom wall 36 and a plurality of sidewalls 38 and has an open upper end 40. The upper end of the sidewalls 38 provide a mounting surface 42 to which the voltage regulator 30 is secured, and the sidewall 38 adjacent the slip rings 28a and 28b is provided with an opening 44 through which the brushes 26a and 26b of the brush assembly 22 extend to operably engage the slip rings 28a and 28b.

The voltage regulator 30 includes a housing 45, a circuit board 45a, and a power device 45b secured to the upper surface of a mounting plate 46. The mounting plate 46 has a plurality of holes 48. Each of the holes 48 is alignable with a corresponding threaded opening 50 in the mounting surface 42 of the slip ring end frame 16. The voltage regulator 30 is mounted to the slip ring end frame 16 with a plurality of threaded connecting members 52 (FIG. 1).

Alternators and voltage regulators as briefly described above, as well as the components comprising such devices, are well known in the art. Thus, no further description of the various types of alternators and voltage regulators, their components, or their operation is believed necessary in order to enable one skilled in the art to understand the present invention or the relationship of the alternator 10 and the voltage regulator 30 shown in FIGS. 1–3.

When mounting the voltage regulator 30 to the mounting surface 42 of the slip ring end frame 16 in the manner shown in FIGS. 1 and 2, problems have been encountered in that adequate air circulation is not provided across the mounting plate 46, which additionally is designed to serve as a heat sink for transferring heat away from the voltage regulator 30. This occurs due to the fact that the mounting plate 46 of the voltage regulator 30 is dimensioned to cover the open upper end 40 of the cavity 34 and the mounting plate 46 is seated directly on the mounting surface 42. As such, the mounting plate 46 closes off the upper end 40 of the cavity 34 so that air is not able to circulate between the voltage regulator 30 and the slip ring end frame 16, and thus, the internal heat generated within the voltage regulator 30 is not able to be effectively transferred away from the voltage regulator 30. This leads to overheating of the voltage regulator 30 and thus failure of the alternator.

Because of the voltage regulator overheating problems encountered, a need for improving air circulation across the mounting plate 46 of the voltage regulator 30 exists. However, it is desirable that improved air circulation be accomplished without having to substantially alter or modify the configuration of existing alternator components, including the voltage regulator 30, the brush assembly 22, and the slip ring end frame 16.

Figure 4:
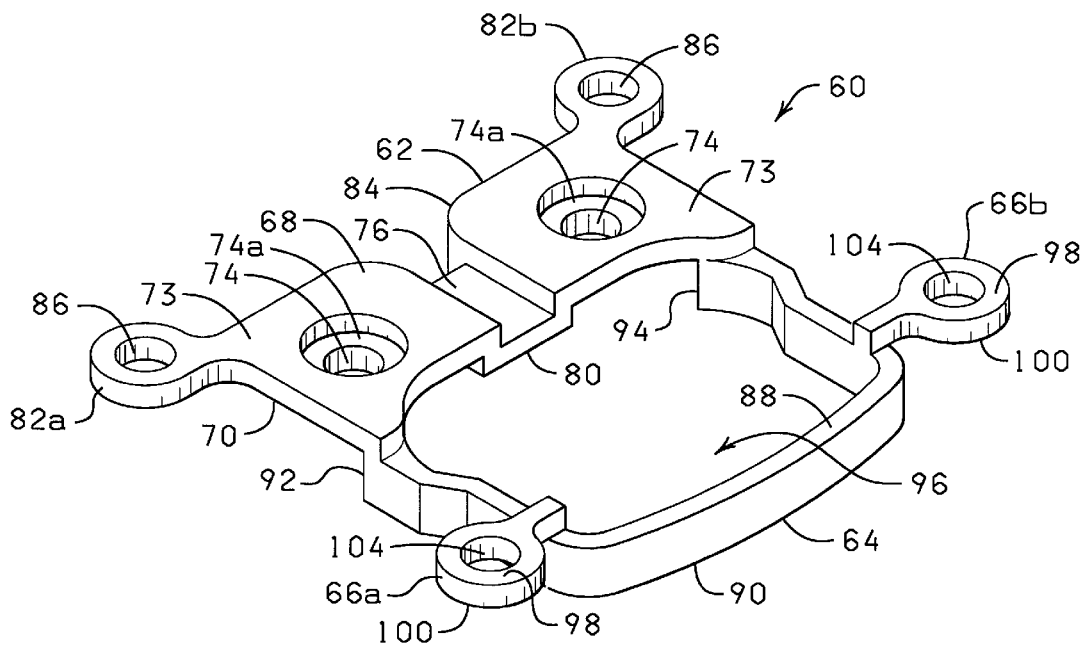
FIG. 4 is a perspective view of a spacing member constructed in accordance with the present invention.
Figure 5:
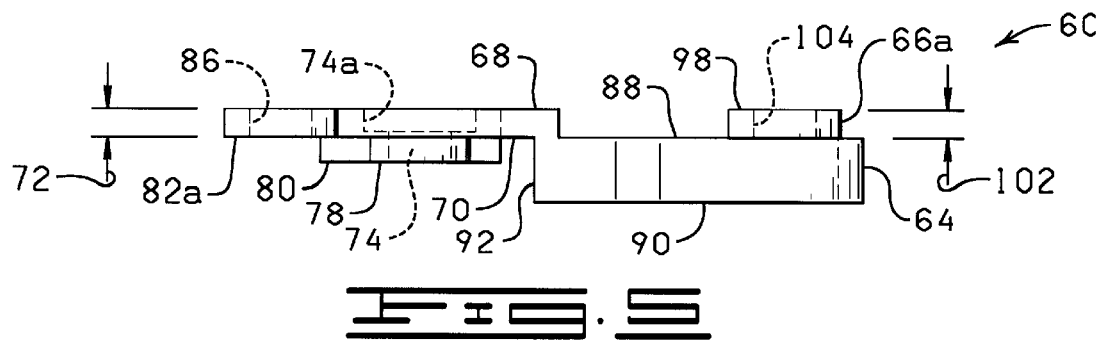
FIG. 5 is a side view of the spacing member of the present invention.

Referring now to FIGS. 4 and 5, a spacing member 60 constructed in accordance with the present invention is illustrated. The spacing member overcomes the above-mentioned deficiencies of the prior art alternator 10, and thus represents an advance in the state of the art relating to alternators. The spacing member 60 effectively increases air circulation about the voltage regulator 30 by supporting the voltage regulator 30 in a spaced apart relationship relative to the mounting surface 42 of the slip ring end frame 16 so as to facilitate air flow between the voltage regulator 30 and the mounting surface 42. The spacing member 60 further supports the voltage regulator 30 in a spaced apart relationship relative to the brush assembly 22 so as to support the brush assembly 22 in the slip ring engaging position.

The spacing member 60 is a unitary member constructed of a suitable rigid material, such as plastic. The spacing member 60 broadly comprises a first end portion 62, a second end portion 64, and a pair of support arms 66a and 66b.

The first end portion 62 has a first side 68, a second side 70, and a thickness 72 (FIG. 5) defined as the distance between the first side 68 and the second side 70. The first end portion 62 is configured to support a portion of the voltage regulator 30 in a spaced apart relationship from the mounting surface 42 of the slip ring end frame 16 and permit the brush assembly 22 to be connected to and properly spaced from the voltage regulator 30. To this end, the first side 68 of the first end portion 62 is configured to substantially correspond to the upper surface of the brush housing 22.

The first end portion 62 is provided with a pair of support surfaces 73, a pair of holes 74 extending through the first end portion 62 from the first side 68 to the second side 70, and a central channel 76. The holes 74 are spaced apart and sized to align with the corresponding holes 31 of the voltage regulator 30 and the corresponding holes 27 of the brush housing 24. Each of the holes 74 is provided with a counterbore 74a on the first side 68 which is sized and shaped to receive the boss members (not shown) of the voltage regulator 30.

The second side 70 of the first end portion 62 has a pair of bosses 78 (only one being visible in FIG. 5) extending about the holes 74 and a central tongue portion 80 sized to be received in the central channel 29 of the brush housing 24 when the spacing member 60 is positioned between the voltage regulator 30 and the brush housing 24.

The first end portion 62 further includes a pair of support arm portions 82a and 82b which extend angularly outwardly such that the second side 70 of the support arm portions 82a and 82b is engagable with mounting surface 42 of the slip ring end frame 16 when the spacing member 60 is disposed on the mounting surface 42 and such that an outer edge 84 of the first end portion 62 is in a spaced relationship with respect to the corresponding sidewall 38 of the slip ring end frame 16 when the spacing member 60 is disposed on the mounting surface 42. Each support arm portion 82a and 82b is provided with a hole 86 which is alignable with the corresponding threaded opening 50 in the mounting surface 42 of the slip ring end frame 16 and the corresponding hole 48 of the mounting plate 46 of the voltage regulator 30.

The second end portion 64 is a substantially U-shaped member having a first side 88, a second side 90, a first end 92, and a second end 94. The first side 88 of the first and second ends 92 and 94 are connected to the second side 70 of the first end portion 62 so that the first side 88 of the second end portion 64 is staggered relative to the first side 68 of the first end portion 62. The U-shaped configuration of the second end portion 64 is such that the second end portion 64 cooperates with the first end portion 62 to define an opening 96 extending through the spacing member 60.

The second end portion 64 is further sized and configured to fit within the cavity 34 of the slip ring end frame 16 so that the first side 88 of the second end portion 64 is substantially level with the mounting surface 42 when the spacing member 60 is disposed on the mounting surface 42. The second end portion 64 of the spacing member 60 is shown to have a configuration which substantially conforms to the shape of the cavity 34 of the slip ring end frame 16. However, it will be appreciated that the second end portion 64 could be formed into a variety of configurations which would create a significant air passage through the spacing member 60.

The support arms 66a and 66b are characterized as having a first side 98, a second side 100, and a thickness 102 (FIG. 5) defined as the distance between the first side 98 and the second side 100. The second side 100 of each of the support arms 66a and 66b is connected to the first side 88 of the second end portion 64 so that first side 98 of each of the support arms 66a and 66b is staggered relative to the first side 88 of the second end portion 64 and the first side 98 of each of the support arms 66a and 66b is in a coplanar relationship with the first end portion 62.

Each support arm 66a and 66b is provided with a hole 104. The support arms 66a and 66b extend outwardly from the second end portion 64 so that the holes 104 of the support arms 66a and 66b are alignable with the corresponding opening 50 in the mounting surface 42 and the corresponding hole 48 of the mounting plate 46 of the voltage regulator 30. The thickness 102 of the support arms 66a and 66b is equal to the thickness 72 of the first end portion 62.

Figure 6:
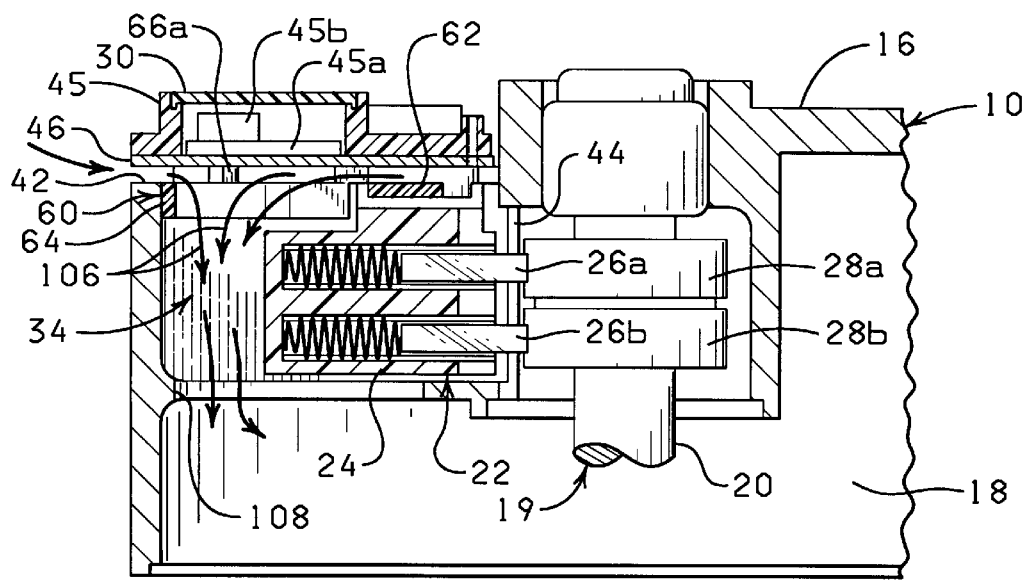
FIG. 6 is a partially cross sectional view of the alternator of FIG. 1 with the spacing member of the present invention employed therein.

FIG. 6 illustrates the voltage regulator 30 connected to the slip ring end frame 16 with the spacing member 60 positioned between the voltage regulator 30 and the mounting surface 42, and the spacing member 60 positioned between the voltage regulator 30 and the brush assembly 22. To mount the voltage regulator 30 to the slip ring end frame 16, the spacing member 60 is first secured between the voltage regulator 30 and the brush assembly 22. When properly secured, the bosses 78 of the first end portion 62 are disposed in the counterbores 27a of the brush housing 24 and the boss members (not shown) of the voltage regulator 30 are positioned in the counterbores 74a of the first end portion 62, and the holes 86 of the support arm portions 82a and 82b and the holes 104 of the support arms 66a and 66b aligned with the corresponding holes 48 of the mounting plate 46 of the voltage regulator 30. The combination of the voltage regulator 30, the spacing member 60, and the brush assembly 22 is then secured to the mounting surface 42 with the connecting members 52.

When the spacing member 60 is positioned between the voltage regulator 30 and the mounting surface 42, the staggered relationship of the second end portion 64 with the first end portion 62 and the support arms 66a and 66b forms several air flow passages, indicated by arrows 106 in FIG. 6, which facilitate the flow of air across the lower surface of the mounting plate 46 of the voltage regulator 30 so as to enhance heat transfer away from the voltage regulator 30 as air is pulled through the alternator 10 by the fan 21 (FIG. 1).

Figure 7:
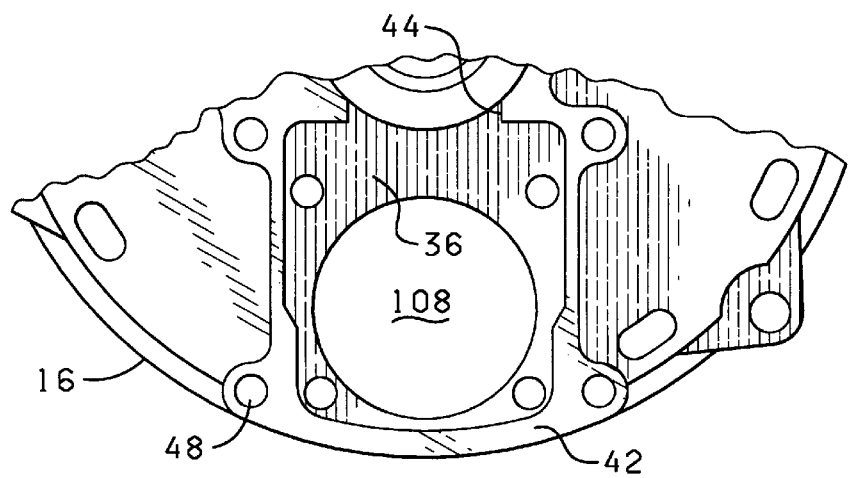
FIG. 7 is a top plan view of a portion of the slip ring end frame of the alternator modified in accordance with the present invention.

Even with the increased flow area provided about the voltage regulator 30 by use of the spacing member 60, the enclosed configuration of the cavity 34 may still restrict the flow of air through the cavity 34. Therefore, it may be desirable to slightly modify the slip ring end frame 16 so as to increase the amount of air that can flow through the cavity 34. FIGS. 6 and 7 illustrate the slip ring end frame 16 having been modified by drilling out a substantial portion of the bottom wall 36 so as provide an enlarged flow passage 108 through the bottom wall 36.

The construction of the spacing member 60 of the present invention as a unitary member has many advantages, including ease of manufacture and installation. However, it will be appreciated that numerous changes may be made which will readily suggest themselves to those skilled in the art and which are accomplished within the spirit of the invention disclosed and as defined in the appended claims. For example, the spacing member 60 can be constructed as several individual, spaced apart members, which cooperate to support the voltage regulator 30 in a spaced apart relationship relative to the mounting surface 42 of the slip ring end frame 16 so as to provide an air flow passage between the voltage regulator 30 and the mounting surface 42 and to support the voltage regulator 30 in a spaced apart relationship relative to the brush assembly 22 so as to support the brush assembly 22 in the slip ring engaging position. Therefore, the spirit and scope of the appended claims should not be limited to the description of the preferred embodiment described herein.

What is claimed is:

1. In an alternator of the type having an electrical generating assembly housed in a frame having an external mounting surface to which a voltage regulator is mounted and an opening for receiving a brush assembly wherein the brush assembly is connected to the voltage regulator and has a pair of brushes engaging a pair of slip rings of the electric generating assembly when the brush assembly is positioned in a slip ring engaging position, the improvement comprising:

spacing means for supporting the voltage regulator in a spaced apart relationship relative to the mounting surface of the frame so as to provide an air flow passage between the voltage regulator and the mounting surface and into the opening of the frame for enhancing heat transfer away from the voltage regulator and for supporting the voltage regulator in a spaced apart relationship relative to the brush assembly so as to support the brush assembly in the slip ring engaging position, wherein the spacing means comprises:

a first end portion having a first side and a second side and a pair of support arm portions;

a second end portion having a first side and a second side, the second end portion connected to the first end portion such that the first side of the first end portion is in a staggered relationship relative to the first side of the second end portion; and a pair of support arms, each support arm having a first side and a second side and each support arm connected to the second end portion such that the first side of each of the support arms is in a staggered relationship relative to the first side of the second end portion and the first side of each of the support arms is in a coplanar relationship with the first side of the first end portion.

2. The improvement of claim 1 wherein the second end portion has a substantially U-shaped configuration.

3. In an alternator of the type having an electrical generating assembly housed in a frame having an external mounting surface to which a voltage regulator is mounted and a cavity defined by a bottom wall and a plurality of sidewalls for receiving a brush assembly which is connected to the voltage regulator, the brush assembly having a pair of brushes engaging a pair of slip rings of the electric generating assembly when the brush assembly is positioned in a slip ring engaging position, the improvement comprising:

spacing means for supporting the voltage regulator in a spaced apart relationship relative to the mounting surface of the frame so as to provide an air flow passage between the voltage regulator and the mounting surface and into the cavity of the frame for enhancing heat transfer away from the voltage regulator and for supporting the voltage regulator in a spaced apart relationship relative to the brush assembly so as to support the brush assembly in the slip ring engaging position, wherein the spacing means comprises:

a first end portion having a first side and a second side and a pair of support arm portions;

a second end portion having a first side and a second side, the second end portion connected to the first end portion such that the first side of the first end portion is in a staggered relationship relative to the first side of the second end portion; and a pair of support arms, each support arm having a first side and a second side and each support arm connected to the second end portion such that the first side of each of the support arms is in a staggered relationship relative to the first side of the second end portion and the first side of each of the support arms is in a coplanar relationship with the first side of the first end portion; and the bottom wall of the frame provided with a central opening to increase air flow through the cavity of the frame.

4. The improvement of claim 3 wherein the second end portion is configured to fit within the cavity of the frame.

5. The improvement of claim 4 wherein the second end portion has a substantially U-shaped configuration.

6. An alternator, comprising:

a frame having an external mounting surface and an opening;

an electrical generator assembly housed in the frame, the electrical generator assembly including a pair of slip rings;

a voltage regulator mounted to the external mounting surface of the slip ring end frame;

a brush assembly connected to the voltage regulator and having a pair of brushes engaging the slip rings when the brush assembly is positioned in a slip ring engaging position; and spacing means for supporting the voltage regulator in a spaced apart relationship relative to the mounting surface of the frame so as to provide an air flow passage between the voltage regulator and the mounting surface and into the opening of the frame for enhancing heat transfer away from the voltage regulator and for supporting the voltage regulator in a spaced apart relationship relative to the brush assembly so as to support the brush assembly in the slip ring engaging position, wherein the spacing means comprises:

a first end portion having a first side and a second side and a pair of support arm portions;

a second end portion having a first side and a second side, the second end portion connected to the first end portion such that the first side of the first end portion is in a staggered relationship relative to the first side of the second end portion; and a pair of support arms, each support arm having a first side and a second side and each support arm connected to the second end portion such that the first side of each of the support arms is in a staggered relationship relative to the first side of the second end portion and the first side of each of the support arms is in a coplanar relationship with the first side of the first end portion.

7. The improvement of claim 6 wherein the second end portion has a substantially U-shaped configuration.

8. A spacing member for supporting a voltage regulator in a spaced apart relationship relative to a mounting surface of a frame of an alternator and for supporting the voltage regulator in a spaced apart relationship relative to a brush assembly which is connected to the voltage regulator and extended into the frame, the spacing member comprising:

a first end portion having a first side and a second side and a pair of support arm portions;

a second end portion having a first side and a second side, the second end portion connected to the first end portion such that the first side of the first end portion is in a staggered relationship relative to the first side of the second end portion; and a pair of support arms, each support arm having a first side and a second side and each support arm connected to the second end portion such that the first side of each of the support arms is in a staggered relationship relative to the first side of the second end portion and the first side of each of the support arms is in a coplanar relationship with the first side of the first end portion.

9. The spacing member of claim 8 wherein the second end portion has a substantially U-shaped configuration.

10. In an alternator of the type having an electrical generating assembly housed in a frame having an external mounting surface to which a voltage regulator is mounted and an opening for receiving a brush assembly wherein the brush assembly is connected to the voltage regulator and has a pair of brushes engaging a pair of slip rings of the electric generating assembly when the brush assembly is positioned in a slip ring engaging position, the improvement comprising:

a spacing member having a portion positioned between the voltage regulator and the external mounting surface of the frame so as to support the voltage regulator in a spaced apart relationship relative to the mounting surface of the frame and provide an air flow passage between the voltage regulator and the mounting surface and into the opening of the frame for enhancing heat transfer away from the voltage regulator and the spacing member having another portion positioned between the voltage regulator and the brush assembly so as to support the voltage regulator in a spaced apart relationship relative to the brush assembly so as to support the brush assembly in the slip ring engaging position.

* * * * *